US008888482B2

(12) United States Patent
Hoellriegl et al.

(10) Patent No.: US 8,888,482 B2
(45) Date of Patent: Nov. 18, 2014

(54) BLOW MOULD

(75) Inventors: Thomas Hoellriegl, Teublitz (DE); Florian Schmid, Ihrlerstein (DE); Thomas Spitzer, Wiesent (DE); Thomas Philipp, Sinzing-Eilsbrunn (DE); Frank Winzinger, Regensburg (DE)

(73) Assignee: Krones AG (DE)

( * ) Notice: Subject to any disclaimer, the term of this patent is extended or adjusted under 35 U.S.C. 154(b) by 371 days.

(21) Appl. No.: 13/140,783

(22) PCT Filed: Dec. 8, 2009

(86) PCT No.: PCT/EP2009/066566
§ 371 (c)(1),
(2), (4) Date: Aug. 3, 2011

(87) PCT Pub. No.: WO2010/069808
PCT Pub. Date: Jun. 24, 2010

(65) Prior Publication Data
US 2011/0280984 A1 Nov. 17, 2011

(30) Foreign Application Priority Data
Dec. 19, 2008 (DE) .......................... 10 2008 063 939

(51) Int. Cl.
*B29C 49/56* (2006.01)
*B29C 33/20* (2006.01)
*B29C 33/26* (2006.01)

(52) U.S. Cl.
CPC .............. *B29C 49/56* (2013.01); *B29C 33/202* (2013.01); *B29C 33/26* (2013.01)
USPC ........................................................ 425/541

(58) Field of Classification Search
USPC ............................................. 425/541, 451.9
See application file for complete search history.

(56) References Cited

U.S. PATENT DOCUMENTS 3,825,396 A * 7/1974 Kontz ............................ 425/541
4,083,910 A * 4/1978 Tits et al. ....................... 425/541
(Continued)

FOREIGN PATENT DOCUMENTS

DE 4212583 10/1993 .............. B29C 49/56
DE 69204407 5/1996 .............. B29C 49/56
(Continued)

OTHER PUBLICATIONS

International Search Report issued in PCT/EP2009/066566 dated May 1, 2011 (5 pgs).
German Search Report dated Aug. 17, 2011, File Reference 20 2008 016 838.4, (5 pgs).

*Primary Examiner* — James Mackey
(74) *Attorney, Agent, or Firm* — Hayes Soloway P.C.

(57) ABSTRACT

A device for transforming plastics preforms into containers includes at least one blow mold for receiving the plastics preforms. The blow mold has two mold parts, which can be pivoted with respect to each other about a connecting axis, with at least one locking element, which is arranged on one of the mold parts and interacts with at least one counter element arranged on the other mold part, in order to lock the two mold parts with respect to each other. The counter element is arranged about an axis arranged substantially parallel to the connecting axis and can be turned between a locking position, and an unlocking position. The device has an actuating element for turning the counter element, having a drive element which interacts with the counter element to actuate it.

18 Claims, 9 Drawing Sheets

(56) References Cited

U.S. PATENT DOCUMENTS

| | | | | |
|---|---|---|---|---|
| 4,626,190 A * | 12/1986 | Hellmer | ............ | 425/541 |
| 6,918,754 B2 | 7/2005 | Albrecht | ............ | 425/529 |
| 7,341,443 B2 | 3/2008 | Lemaistre et al. | ............ | 425/540 |
| 7,377,766 B2 * | 5/2008 | Lemaistre et al. | ............ | 425/541 |
| 7,384,261 B2 | 6/2008 | Mie et al. | ............ | 425/540 |
| 2006/0275525 A1 | 12/2006 | Lemaistre et al. | ............ | 425/541 |
| 2007/0026098 A1 | 2/2007 | Lemaistre et al. | ............ | 425/170 |

FOREIGN PATENT DOCUMENTS

| | | | | |
|---|---|---|---|---|
| DE | 200 07 429 | 5/2001 | ............ | B29C 49/56 |
| DE | 10152050 | 5/2003 | ............ | B29C 49/42 |
| DE | 60 2004 004 398 | 11/2007 | ............ | B29C 33/26 |
| EP | 1535719 | 6/2005 | ............ | B29C 49/56 |
| EP | 1276598 | 8/2005 | ............ | B29C 33/20 |
| EP | 2149446 | 2/2010 | ............ | B29C 49/36 |
| WO | WO 2010/013211 | 2/2010 | ............ | B29C 49/56 |

* cited by examiner

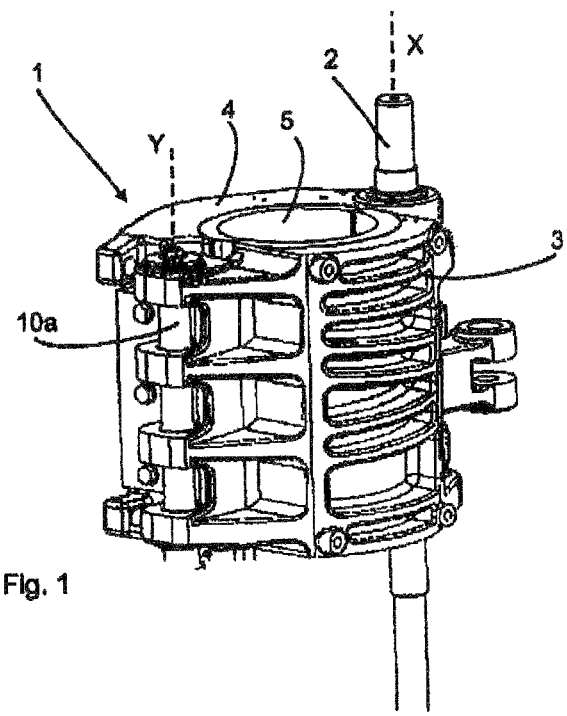
Fig. 1
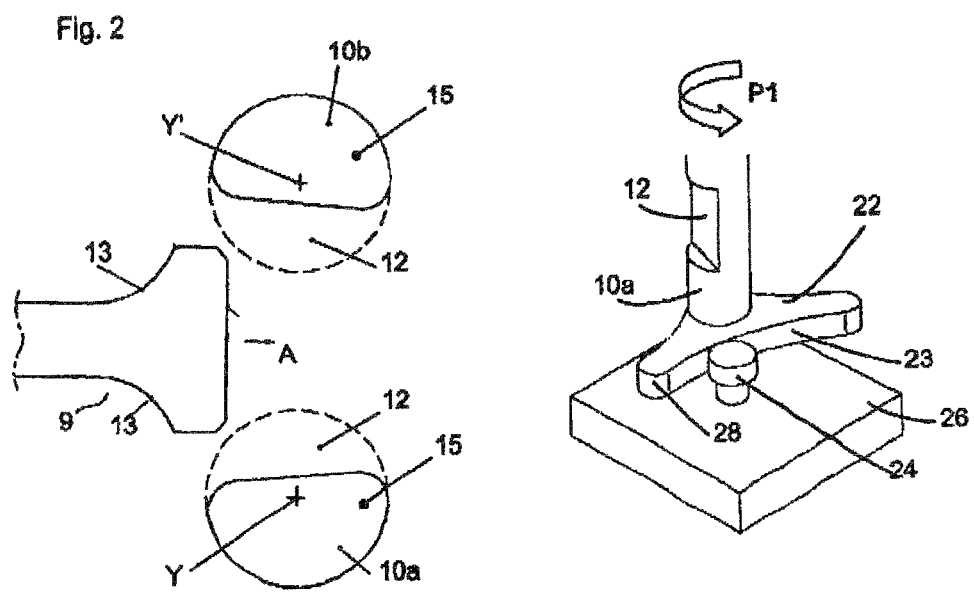
Fig. 2
Fig. 3a

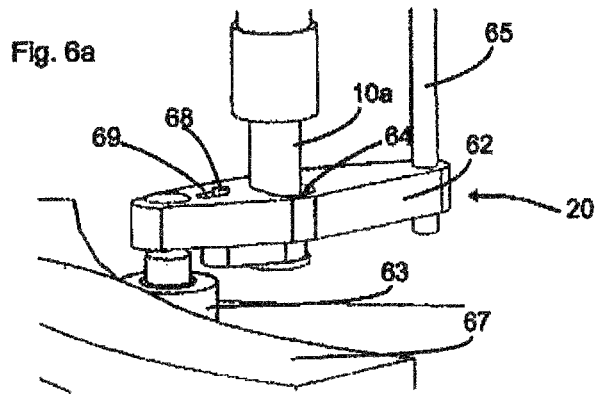
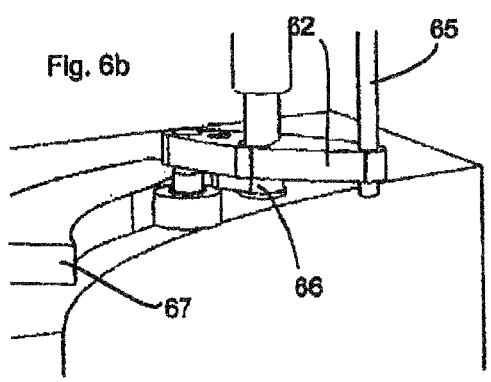
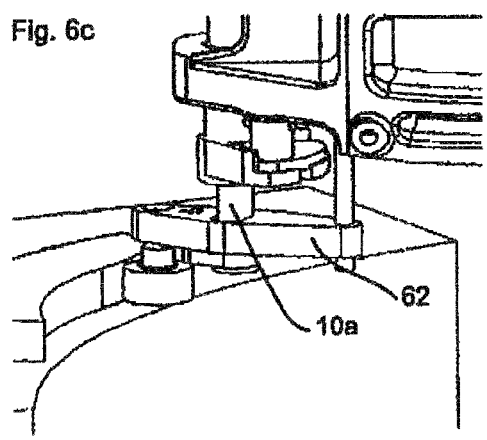
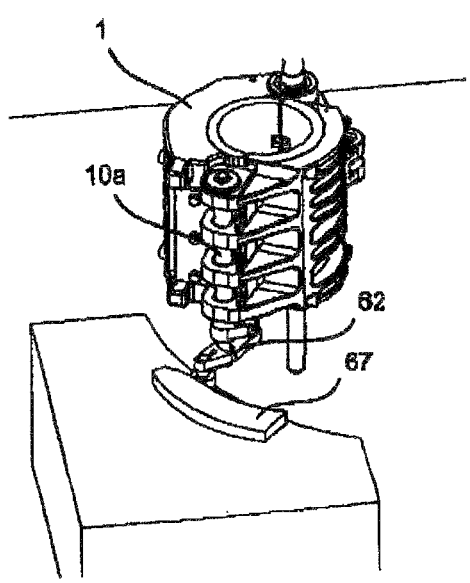
Fig. 6a
Fig. 6b
Fig. 6c
Fig. 6d

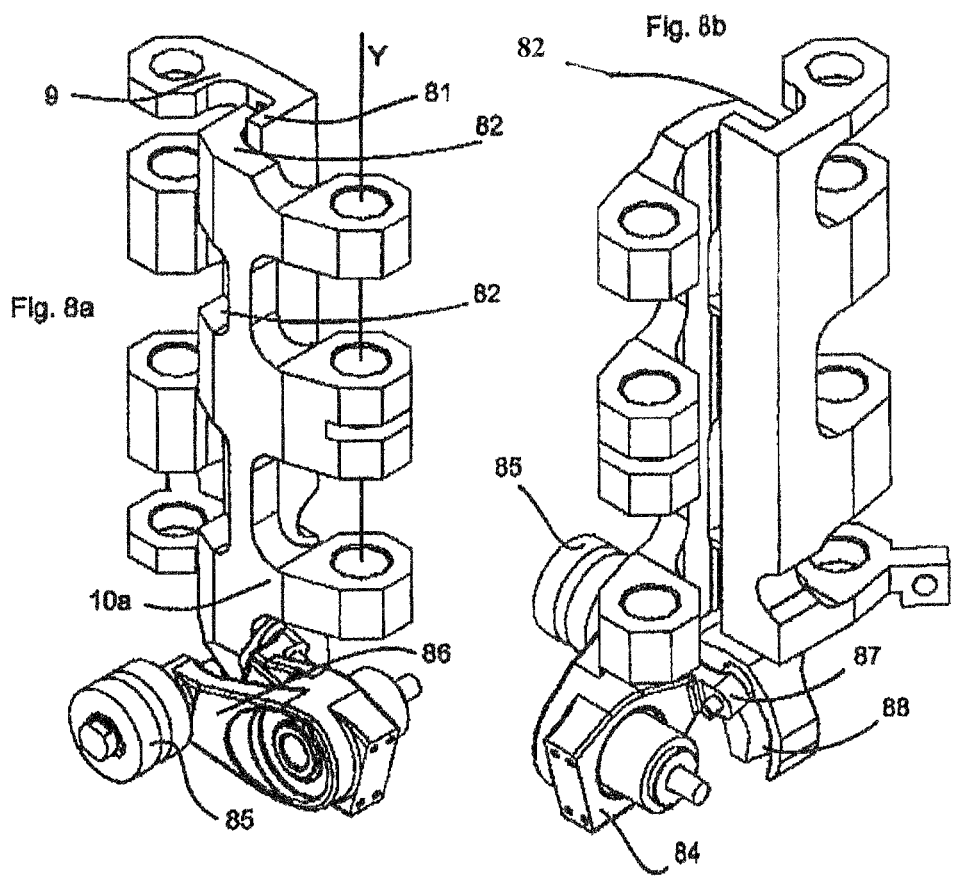
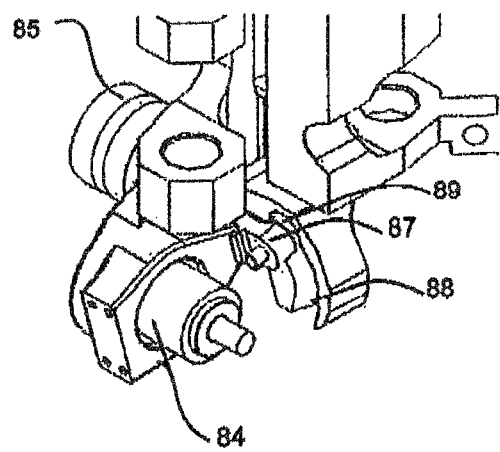
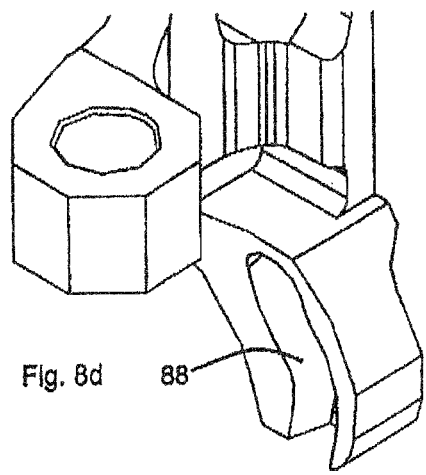

BLOW MOULD

BACKGROUND OF THE INVENTION

The present invention relates to an apparatus for moulding plastic preforms into plastic containers. Such apparatus have been known from the prior art for a long time and usually include a plurality of blow stations, with blow moulds being arranged at these blow stations, on the inside of which the plastic preforms are arranged so as to be expanded into plastic containers for example by means of pressurised air.

Blow moulds of this kind usually have two mould halves that can be opened and closed so as to receive the plastic containers on the inside thereof.

During the actual expansion process, these mould halves are locked against each other, so that they cannot come open during the actual moulding process.

From U.S. Pat. No. 7,384,261 B2, a blow moulding apparatus for producing thermal plastic containers is known. In this apparatus, a locking mechanism for locking two blow mould halves against each other is provided. This locking mechanism has here a locking member which can be pivoted about an axis. Further, a cam mechanism may be provided in order to activate this locking mechanism.

From DE 42 12 583 A1 an apparatus for blow moulding is known. This apparatus also has mould carriers as well as a locking unit for locking these two mould carriers. Here, an adjustment element is provided which is guided substantially in the direction of a centre line of the blow mould.

DE 692 04 407 T2 describes an apparatus for opening and closing a divided mould. Here again, two mould halves are provided which can be pivoted relative to each other. Further, this apparatus includes two actuating arms which are fixed to the two mould halves at one of their ends so that they can rotate freely.

EP 1 276 598 B1 also describes a blow mould and a blow moulding machine. In this blow moulding machine, a shaft for locking and unlocking the respective mould halves is provided, said shaft having an external contour such that the shaft rests in a locking position at least partially on a locking element and in an unlocking position releases said locking element.

The content of the above-mentioned EP 1 276 598 B1 is herewith enclosed in its entirety by reference in the subject matter of the present application.

SUMMARY OF THE INVENTION

The present invention is based on the task of simplifying the actuation of a corresponding locking mechanism and to enable in particular also a rapid, reliable and accurate locking and unlocking operation.

An apparatus according to the invention for moulding plastic preforms into containers includes at least one blow mould for receiving the plastic preforms. This blow mould includes here at least two mould parts which can be pivoted relative to each other about a connection axis as well as at least one locking element disposed on one of the mould parts, said locking element cooperating with at least one counter element disposed on the other mould part so as to lock the two mould parts against each other. The counter element is here a counter element that can be rotated about an axis arranged parallel to the connection axis, which counter element can be rotated between a locking position in which the blow mould is locked and an unlocking position in which the blow mould can be opened, said counter element being designed in such a way that the counter element rests in the locking position at least partially on the locking element and in the unlocking position releases the locking element.

According to the invention, the apparatus includes an actuating element for rotating the counter element, said actuating element including a drive element which cooperates with the counter element so as to actuate the latter.

The counter element is preferably a shaft and this shaft has an external contour such that the counter element rests in its locking position at least partially on the counter element and in the unlocking position releases the locking element. However, it would also be possible for the counter element to include a plurality of hooks which are pivoted by the rotation of the counter element and which engage in a locking area of the respectively other mould part so as to lock the mould parts against each other. The mould parts are preferably half-shells which in the assembled condition receive a preform or a plastic container.

Advantageously, a drivable element is disposed on the counter element, which has a guiding surface that cooperates with a guiding protrusion movable relative to the counter element in such a way that this relative movement of the guiding protrusion in relation to the guiding surface causes a rotation of the counter element. The guiding protrusion is here preferably arranged to be stationary and the counter element moves relative to this guiding protrusion. In this way, a movement of the entire blow mould can be translated into a rotary movement of the counter element.

This guiding surface is preferably curved at least in sections. In this connection, a radius of curvature of this guiding surface particularly preferably deviates from a radius of curvature of a movement path of the blow mould, so that in this way the counter element or the shaft can be swung in.

In a further advantageous embodiment, a bevel gear is arranged at least on the counter element or on the actuating element. The bevel gear is preferably provided here on the end of the counter element.

This bevel gear preferably cooperates with a further bevel gear arranged on the actuating element or on the counter element so as to rotate the counter element. Due to the use of bevel gears, a drive shaft can be inclined in relation to a longitudinal direction of the movement element or the rotary axis thereof, and in this way, as will be shown with reference to the figures, the movement can be translated in a particularly advantageous manner.

Preferably, the further bevel gear is arranged on a lever that can be pivoted about an axis of the further bevel gear. As a result of a pivoting action of this lever, the further bevel gear is thus rotated and thus also the first-mentioned bevel gear and thus also the movement element are rotated. Preferably, this lever can be pivoted here in a vertical plane.

In a further advantageous embodiment, the actuating element includes engagement means cooperating with a thread provided on the movement element so as to cause the rotation thereof. This thread is preferably a coarse thread, so that as a result of a longitudinal movement a rotation of the movement element is generated. Conversely, an engagement element could also be provided on the movement element, which engagement element cooperates with a thread of the actuating element. A thread could also be provided both on the movement element and on the actuating element. The engagement means mentioned could engage here in a winding of the thread of the respectively other element.

Preferably, the actuating element mentioned can be moved in the direction of the rotary axis of the actuating element. As a result of this longitudinal movement, as mentioned above, a rotation of the movement element is caused.

In a further advantageous embodiment, the thread is an external thread. This means that an external thread is provided on the movement element, which external thread is engaged by a protrusion of the actuating element. The movement element or the thread can be fed through an opening of the actuating element, on the inner surface of which the engagement means are disposed. In this connection, the engagement element can be formed as a tip.

In a further advantageous embodiment, the apparatus includes a guiding rod extending parallel to the movement element for guiding a movement of the actuating element. In this way, a reliable guidance of the actuating element can be achieved even in the case of the rapid movements involved. The actuating element is preferably moved by a guide curve which is arranged to be stationary. However, it would also be possible for a guide roller to be provided in order to simplify the movement.

In a further advantageous embodiment, the actuating element has a plate-shaped body that is arranged to be movable relative to the movement element and that has a recess, into which at least one section of the movement element protrudes. In this embodiment, a sliding guide is provided as the actuating mechanism, in which sliding guide the movement element is guided and is at the same time rotated in a defined manner.

This plate-shaped body can therefore preferably be pivoted about a pivot axis that is parallel to the rotary axis of the movement element, but which does not coincide with this rotary axis.

In a further advantageous embodiment, the drive element cooperates with an end-side driven element disposed in the counter element.

In a further embodiment, a first guiding body is disposed on the counter element, and a second guiding body is disposed on the actuating element, said first guiding body being displaceable relative to the second guiding body, and as a result of a displacement of the first guiding body relative to the second guiding body, a rotation of the counter element is achieved. Preferably, one of the two guiding bodies is a guiding groove, into which the other guiding body, which is preferably formed as a protrusion or a roller, engages.

As a result of a displacement of the protrusion relative to the groove, also a rotation of the counter element is achieved. Preferably, the groove is formed on the counter element and the protrusion is formed on the actuating element. Thus, it would be possible, for example, for the actuating element to be a lever that can be pivoted about a predefined axis, on which the protrusion or the roller engaging in the groove is formed.

The present invention further relates to a blow mould, in particular for an apparatus for moulding plastic preforms into plastic containers, said blow mould including two mould parts which can be pivoted relative to each other about a connection axis, and at least one locking element disposed on one of the mould parts, which locking element cooperates with at least one counter element disposed on the other mould part so as to lock the two mould parts against each other. The counter element is here a counter element that is disposed parallel to an axis arranged on the connection axis, and this counter element can be rotated between a locking position in which the blow mould is locked and an unlocking position in which the blow mould can be opened, said counter element being designed in such a way that the counter element in its locking position rests at least partially on the locking element and in its unlocking position releases the locking element.

According to the invention, an actuating element for rotating the counter element is provided, said actuating element including a drive element that cooperates with the counter element so as to actuate the same.

BRIEF DESCRIPTION OF THE DRAWINGS

Further advantageous embodiments will become evident from the attached drawings, wherein:

FIG. 1 shows a view of a blow mould;
FIG. 2 shows a schematic view for illustrating a locking mechanism according to the invention;
FIG. 3a shows a schematic view for illustrating a locking mechanism according to the invention in a first embodiment;
FIGS. 6a-6h show views of an apparatus according to the invention in a fourth embodiment;
FIGS. 8a-8d show views of an apparatus according to the invention in a sixth embodiment.

DETAILED DESCRIPTION OF THE INVENTION

Figure 4A:
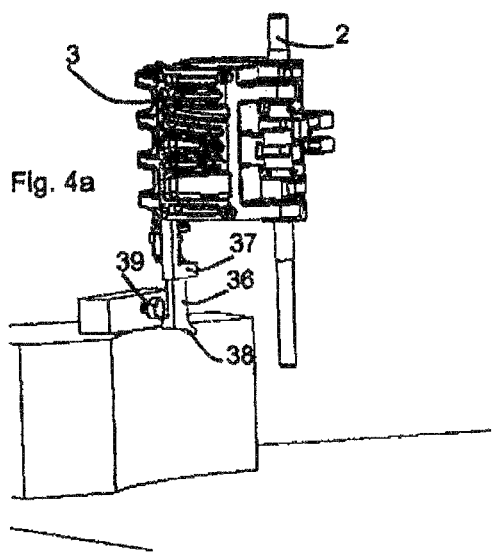
FIGS. 4a-4g show various views for illustrating a locking mechanism in a second embodiment.

FIG. 1 shows a partial view of a blow mould. This blow mould 1 includes two mould halves 3, 4 that can be rotated about a connection axis 2 and that are used as mould carriers, more specifically a first mould half 3 and a second mould half 4. These two mould halves 3, 4 are designed in such a way that they form an inner cavity 5 in their closed condition, in which a preform (not shown) can be blow moulded, which means contoured, by means of mould inserts (not shown) in a stretch blow moulding process.

In order to close the two mould halves 3, 4, these are pivoted about the connection axis 2 in such a way that their lateral surfaces abut against each other. FIG. 1 shows a closed locked condition of the two mould halves 3, 4. Reference numeral 10a refers to a movement element that can be rotated so as to lock the two mould halves 3, 4 to each other.

FIG. 2 shows a top view onto a central area for illustrating the locking element. Here, too, the movement element 10a is provided which is implemented as a shaft which in turn has a recess 12. Reference numeral 9 relates to a locking element which may be inserted along the arrow A between the movement element 10a and a further movement element 10b which is formed symmetrically in relation to the movement element 10. The two movement elements 10a, 10b can be rotated here about the axes Y, Y'.

In order to lock the locking mechanism, the movement element 10a, that is the shaft 10, is rotated about a predefined angle, so that a contour 15 engages in a recess 13 of the locking element 9. Correspondingly, also an area of the movement element 10b engages in the corresponding lower area or the recess 13 of the locking element 9.

A rotary movement of the movement element 10b is preferably coupled with a rotary movement of the movement element 10a. In this embodiment therefore two shafts 10a, 10b are attached to the mould part 4, which two shafts can be rotated about a longitudinal axis extending therethrough between the locking position and the unlocking position. The locking element 9 may, in the unlocking position, be at least partially guided through between the shafts 10a, 10b, and in the locking position, the contours 15 of the two movement elements or shafts 10a, 10b rest at least partially against the locking element 12 in such a way that the blow mould 1 is firmly locked.

FIG. 3a shows a first embodiment of an apparatus according to the invention. What can be seen here again is the movement element 10a which includes the recess 12 already mentioned in FIG. 2. This movement element 10a, i.e. the shaft, can here be rotated about the arrow P1 so as to cause the blow mould to be locked or unlocked. To this end, a drivable element 22 is fixedly disposed on the movement element 10a, which drivable element 22 has a guiding surface 23 opposite of which a guiding protrusion moves.

More specifically, this is here not a guiding protrusion, but a rotatable guiding roller, so as to minimise any frictional losses in this way. During operation of the apparatus, the blow mould and thus also the actuating element 10a moves along a circular path which is usually determined by the pitch circle radius of a corresponding carrier on which a plurality of blow moulds is arranged. During this circular movement, the guiding surface 23 is lead past the protrusion 24, and in this way the movement element 22 is rotated in a predefined manner along the arrow P1. This rotation again causes the blow mould to be locked or unlocked. In the terminal areas 28, the drivable element respectively includes rounded surfaces, so that the locking or unlocking operation runs smoothly.

During a movement of the movement element relative to the guiding protrusion 24 in a specified direction, the blow mould is either locked or unlocked. The respectively inverse process, i.e. the unlocking or locking, is enabled by a further guiding surface on the rear side of the drivable element 22. However, it would also be possible to cause a reverse rotation of the movement element 10a through other mechanisms such as for example spring mechanisms. Here, too, it would also be possible for a corresponding drivable element to be arranged on the second movement element 11 (cf. FIG. 2), and this further drivable element would be provided for the respectively inverse process, that is the unlocking or locking.

Figure 4B:
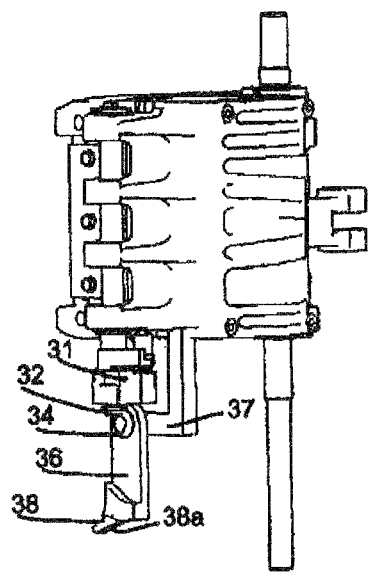

FIG. 4a shows a further embodiment in an apparatus according to the invention. In this case, again a guiding unit 39 in the form of a guiding wheel is provided, and this guiding wheel actuates a lever 36 which in turn is arranged on a carrier 37 which is stationary relative to the blow mould 1. FIG. 4b shows a detailed view of the apparatus shown in FIG. 4a. In this case, a first bevel gear 32 is provided on the movement element 10, which cooperates with a second bevel gear 34 arranged on the lever 36.

Thus, by pivoting the lever 36 about the axis of the second bevel gear 34, the movement element 10 is rotated in a predefined manner as a function of a pivot angle. At the bottom end, the lever 36 includes again a guiding surface 38 which cooperates with the above-mentioned guiding unit 39 or the wheel. By means of a movement element 10 opposite the wheel 39, a pivoting action of the lever is achieved. Corresponding guide rollers, on which the wheel 39 is arranged, could however also be implemented in a manner different to the one illustrated.

Figure 4C:
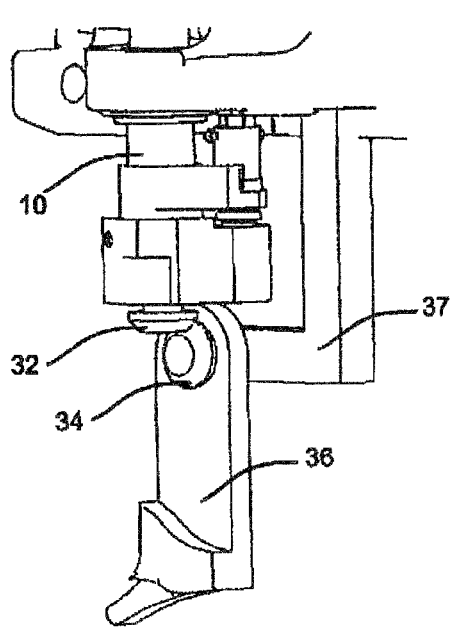
Figure 4D:
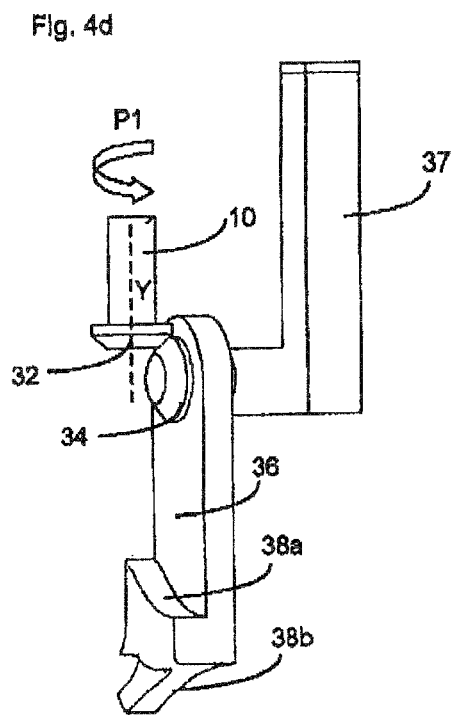
Figure 4E:
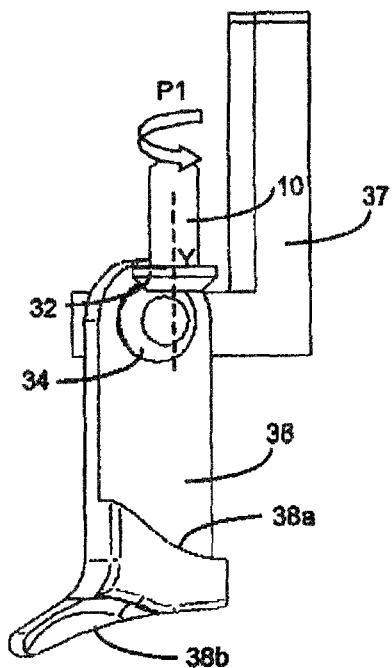

FIGS. 4c to 4e show further views of the locking mechanism according to the invention. In particular, also the lever 36 is shown here in several perspective views. At the bottom end of the lever 36, said guiding surface 38a as well as a further guiding surface 38b are arranged here. By means of these two different guiding surfaces, with the aid of correspondingly arranged guiding cams, both a pivoting of the lever towards the left in FIG. 4a and a pivoting of the lever towards the right in FIG. 4e may be achieved. However, it would also be possible for the lever 36 to be pivoted back due to its own weight. However, here too, a spring could be provided for returning the lever. This spring could be provided for example between the carrier 37 and the lever 36, but also in an area of the movement element.

Figure 4F:
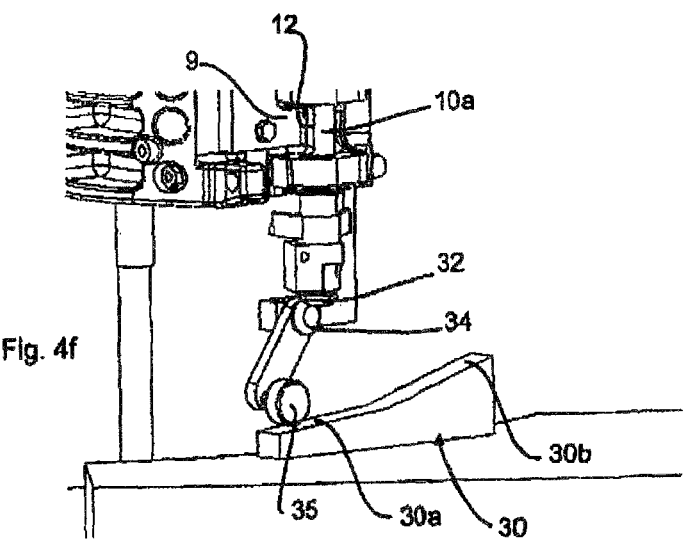
Figure 4G:
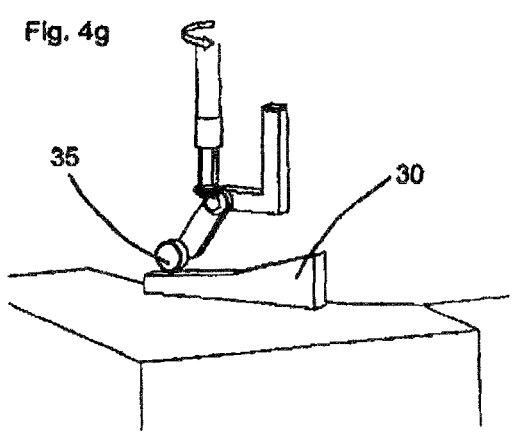

FIGS. 4f and 4g show a further modified embodiment of an apparatus according to the invention. Here, too, a pivotable lever 36 is provided, at the bottom end of which, however, a gear 35 is arranged which is movable relative to a guide curve 30. As shown in FIGS. 4f and 4g, a movement of the movement element 10 along the arrow P can also cause a movement of the gear 35 along the arrow P relative to the guide curve 30.

In this way, the lever 36 is pivoted in a clockwise direction, and as a result also the movement element 10 is rotated. To pivot the lever 36 back it is possible for the guide curve 30a to sink back again and thus also the lever 36 can swing back with a movement of the movement element 10 in a clockwise direction, and in this way the movement element 10 is again rotated in an exactly predefined manner. The angle of rotation, about which the movement element 10 is rotated, is thus determined by the height difference between the area 30b and 30a of the guide curve 30. Preferably, however, a further guiding level (not shown) is provided, which is here provided above the gear 35 and which sinks down in the directions of movement of the lever.

The bevel gear 34 is here arranged in a take-up shaft (not shown), wherein also support means or intermediate shafts can be provided for guiding the lever 36. The cam roller 35 is here also preferably supported in a rotatable manner.

FIGS. 5a to 5f show a further embodiment of an apparatus according to the invention.

In this embodiment, an actuating element 20 is provided which can be moved upwards and downwards in the direction of the axis Y, which means along the arrow P2. Here, a thread 42 of the movement element 10a is guided through this actuating element 20, and during a movement of the actuating element 20, a rotation of the movement element 10a is caused in this way. The thread 42 is preferably a coarse thread, so that a rotation as a result of a displacement of the actuating element 20 is facilitated. Similar to the embodiment shown in FIGS. 4e to 4f, here, too, a cam roller 45 is provided which is moved relative to a guide curve 40, in order to lift the actuating element. A further guiding level (not shown) may be provided for lowering the cam roller.

Reference numeral 46 relates to a further rod which is here used as a twist protection or as a control lever. In this way it is prevented that the actuating element 20 rotates about the thread 42, or the longitudinal direction along the arrow P2 is secured by means of this rod 46. It would be possible here for the rod 46 to be arranged rigidly on the blow mould 1 and to extend through a hole 47a of the actuating element 20, and thus the actuating element 20 would be movable relative to the rod 46. It would however be possible for the rod 46 to be arranged on the actuating element 20 in a fixed manner and to be arranged again on the blow mould 1 so as to be displaceable in the longitudinal direction. Reference numeral 48 relates to a housing or a receptacle that can be used, amongst other things, also for supporting the rod 46.

Inside of the actuating element 20, either an internal thread or a tapering body 49 may be provided here, which engages in the thread 42 and thus causes, in the case of a relative movement of the actuating element 20 along the arrow P2, a rotation of the movement element 10. At the bottom end of the movement element, a stop 47 may be provided which delimits the relative movement of the actuating element relative to the movement element 10 towards the bottom.

Figure 5A:
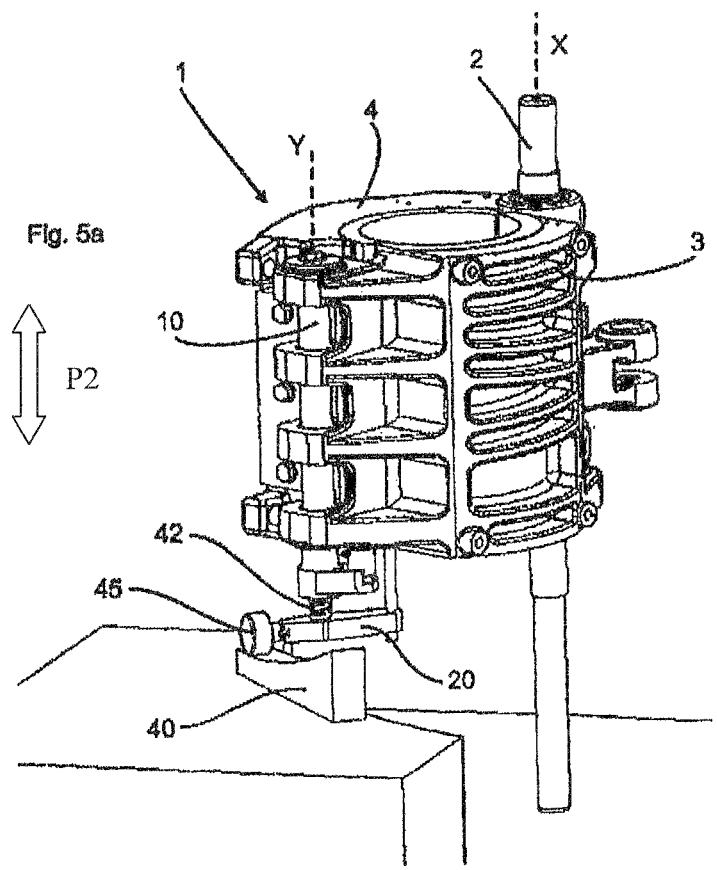
FIGS. 5a-5f show views of an apparatus according to the invention in a third embodiment.
Figure 5B:
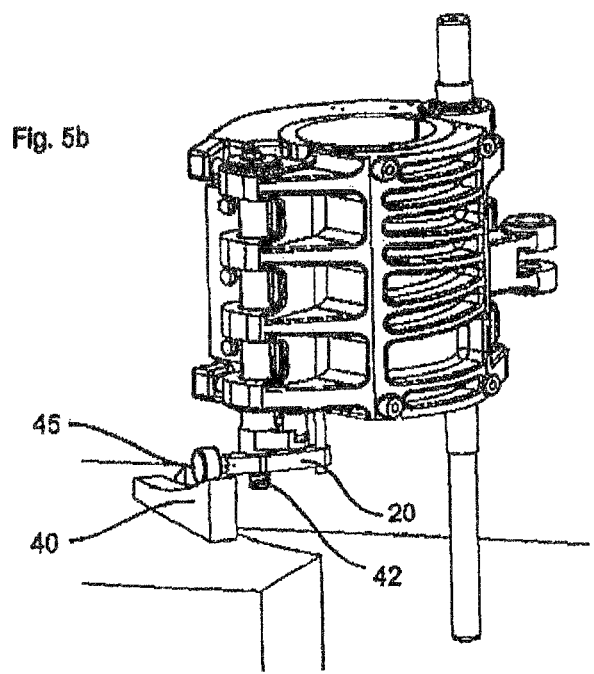
Figure 5C:
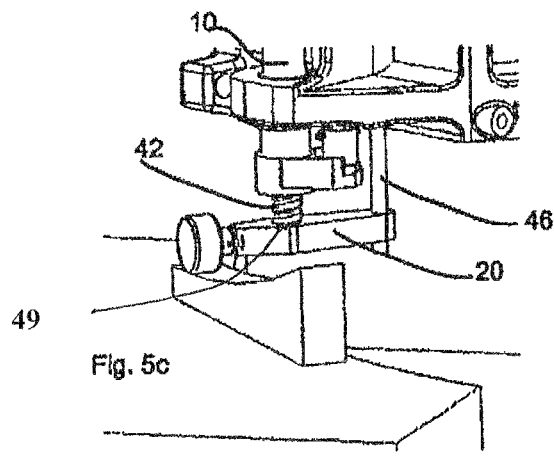
Figure 5D:
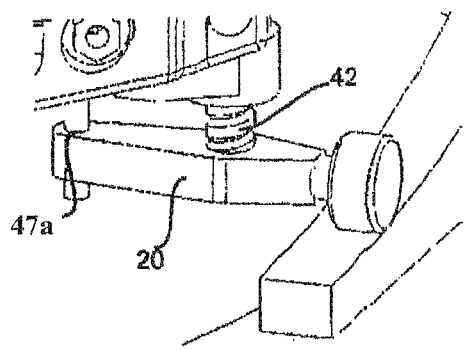
Figure 5E:
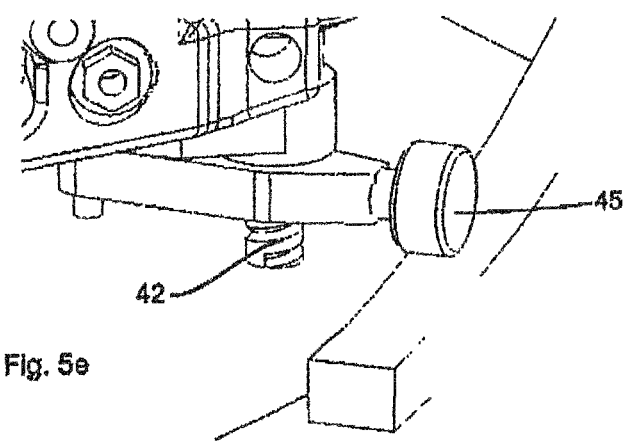

In the situation shown in FIG. 5d, the actuating element 20 is largely lowered so that the thread area 42 extends above the actuating element. In the situation shown in FIG. 5a, the actuating element is lifted, so that the thread 42 protrudes out of the actuating element 20 towards the bottom.

Figure 5F:
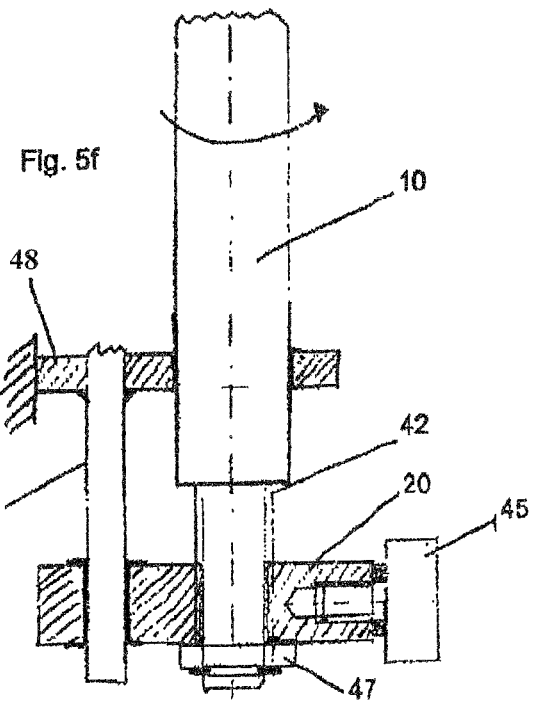

In FIG. 5f, a further termination element 47 is provided which is arranged at the bottom end of the thread and which delimits a movement of the thread 42 relative to the actuating element, so that the actuating element 20 cannot fall off the thread.

FIGS. 6a-6h show a further embodiment of the present invention. In this case, the movement element 10a extends through the actuating element 20 or through an adjustment lever 62 of this actuating element 20. To this end, the actuating lever 62 has an opening 64 which is here formed like a slot that accommodates the movement element 10a. Below this adjustment lever 62, a connection member 66 is provided, which is on the one hand formed in a manner to be rotationally fixed to the movement element 10a and on the other hand includes a pin 68 that protrudes through a further opening 69 into the adjustment lever 62. This adjustment lever is here arranged to be pivotable about a rod 65 or the rotary axis thereof. Reference numeral 67 again identifies a guide curve of the adjustment lever 62.

Reference numeral 63 relates to a guide roller that causes a pivoting of the adjustment lever 62. Thus, as a result of a specific pivoting of the adjustment lever 62, a likewise defined rotation of the movement element 10a can be achieved.

Figure 6E:
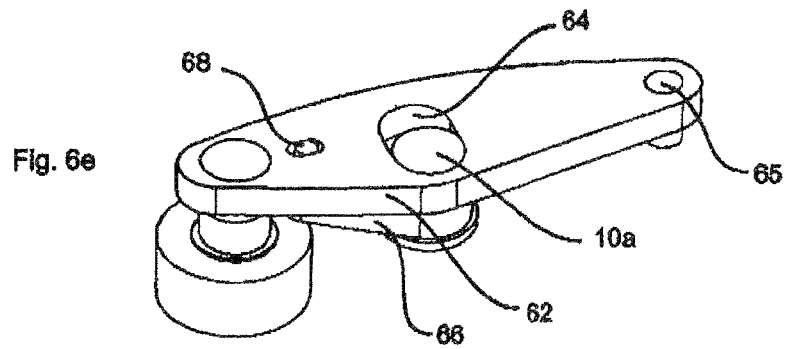
Figure 6F:
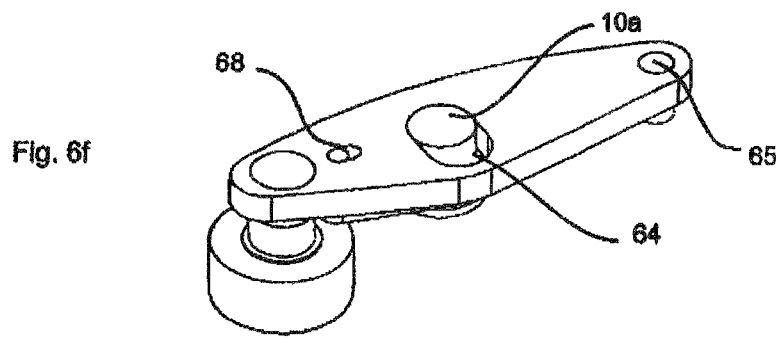
Figure 6G:
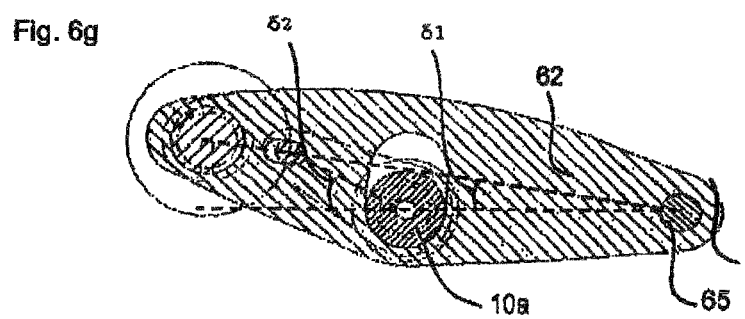
Figure 6H:
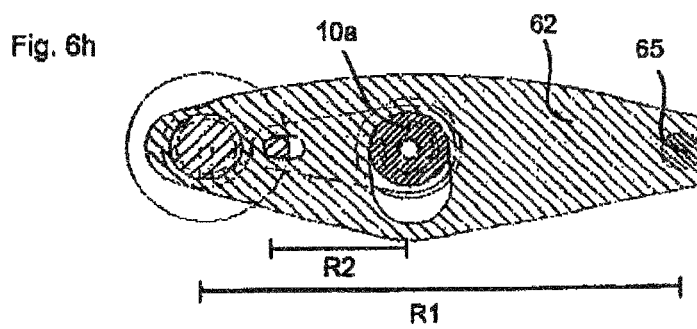

FIGS. 6e-6h illustrate a corresponding rotation of the movement element 10a, which is caused by a pivoting of the adjustment lever 62. It can be seen that the adjustment lever 62 can be pivoted about an angle δ1. However, a pivot action about this angle δ1 causes on the other hand, due to the interplay of the two openings 64, 69, a pivoting of the movement element 10 about the angle δ2, which is here larger than said angle δ1. As a result, a smaller adjustment angle is required in order to achieve a correspondingly higher rotary movement of the movement element 10a. The relationship between the two angles δ1 and δ2 can be adjusted via the radii R1 and R2 or the relationship between them as shown in FIGS. 6g and 6h relative to one another.

Figure 7A:
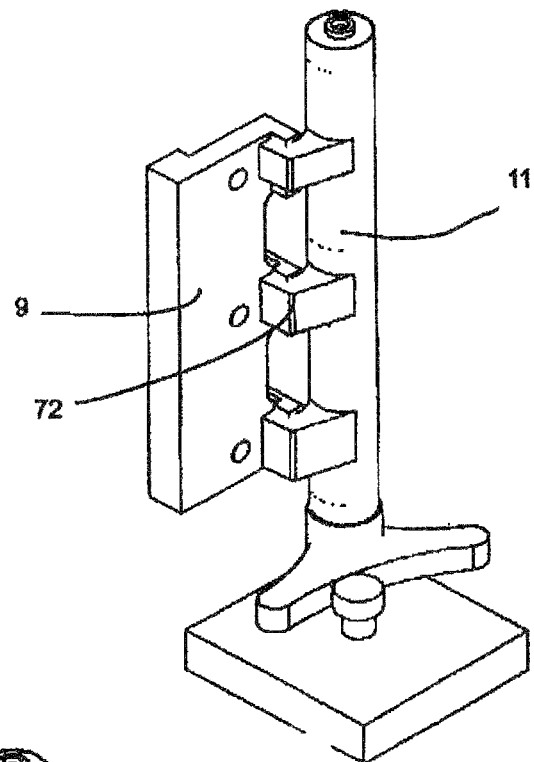
FIGS. 7a-7b show views of an apparatus according to the invention in a fifth embodiment.
Figure 7B:
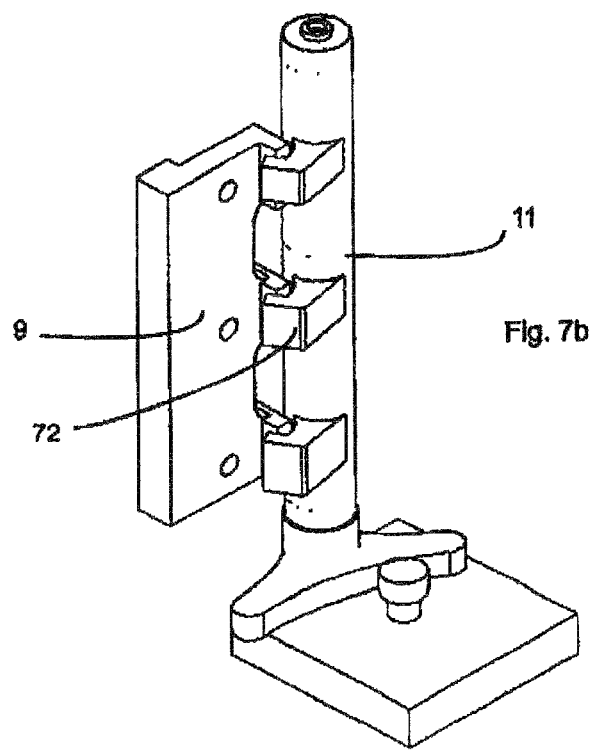

FIGS. 7a and 7b show a further embodiment of the mechanism according to the invention. This embodiment is similar to the embodiment shown in FIG. 3a, but here the movement element 10a is designed in a different way. Here, the movement element 10a has three engagement elements 72 which in a locking condition engage in the locking body 9. The actuation of the movement element 11 shown here, however, is carried out in the same way as illustrated with reference to FIG. 3a. A person skilled in the art will recognise that the other movement mechanisms which are also shown in the figures can be applied to the movement element 11.

FIGS. 8a-8d show a further embodiment of a mechanism according to the invention. Here, again, a cam roller 85, or more specifically a double cam roller 85, is provided which extends along a curved path (not shown). A lever 86 is disposed on this cam roller, which is rotated as a result of a movement of the cam roller. An engagement element is fixedly disposed on this lever 86, and this engagement element causes a pivoting action of the counter element 10a about the axis Y.

As a result of a pivoting action of the counter element 10a, an engagement between the hook 82 and corresponding counter hooks 81 can be achieved or released. FIG. 8c shows this engagement mechanism in more detail. The lever 86 is, as said above, pivotably arranged on a fixed support 84. Further, an engagement body, or more specifically, a roller 89 disposed on a roller support 87, is provided on the lever 86, which roller 89 extends in a groove 88 that is formed on or in the counter element 10a. This groove 88 is here a three-dimensional groove and a movement of the roller 89 within this groove leads to a pivoting action of the counter element 10a about the axis Y. It can be seen that the groove has a curved path and that the roller can roll in this groove 88 without tilting. Preferably, a groove width of the groove 88 will be slightly bigger than a diameter of the roller 89. It would also be conceivable for the roller 89 to be implemented as a double roller in order to prevent a rotation of the roller 89 in two rotary directions, which may occur depending on the load situation, in order to reduce wear on the roller 89 and the groove 88.

The other hook or the locking element 9 cannot be pivoted in the embodiment shown in FIGS. 8a-8d; however, it would also be possible to pivot both hooks for opening or closing the blow mould. Thus, in this embodiment a cam for opening and closing the blow mould is directly integrated in the counter element. The cam for moving the roller 85 in turn is controlled by a cam which is fixed relative to the machine, when the blow stations pass this cam during their circular movement. It would further also be conceivable for a slide coupling to be integrated into the course of movement between the lever 86 and the support 84, so that it would be possible to respond to any jamming of the hooks 82 and 81.

In a further embodiment it would also be possible to provide a spur gear on the movement element 10 or 11, which spur gear cooperates with a further spur gear acting as an actuating element, in order to achieve a rotation of the movement element. In this connection, another lever could be arranged in a further toothed gear or spur gear, which lever would be pivoted by a guide curve so as to achieve in this way a rotary movement of the movement element.

By means of corresponding size relationships between the two spur gears it can thus be established at which degree of pivoting of said lever, which rotary angles of the movement element can be achieved.

All of the features disclosed in the application documents are claimed as being essential to the invention in as far as they are novel over the prior art either individually or in combination.

The invention claimed is:

1. An apparatus for moulding plastic preforms into containers, including at least one blow mould for receiving the plastic preforms, said blow mould including two mould parts that can be pivoted relative to each other about a connection axis, including at least one locking element arranged on one of the mould parts, which locking element cooperates with at least one counter element arranged on the other mould part, in order to lock the two mould parts against each other, said counter element being arranged on an axis (Y, Y') essentially parallel to the connection axis, which counter element is rotatable between a locking position in which the blow mould is locked and an unlocking position in which the blow mould can be opened, said counter element being designed in such a way that the counter element rests in the locking position at least partially on the locking element and in the unlocking position releases the locking element, wherein the apparatus includes an actuating element for rotating the counter element, said actuating element including a drive element cooperating with the counter element so as to actuate the counter element, and wherein the actuating element is movable in the direction of a rotary axis (Y) of the counter element.

2. The apparatus as claimed in claim 1, wherein the counter element is a shaft and this shaft has an external contour such that the counter element in its locking position rests at least partially on the locking element and in the unlocking position releases the locking element.

3. The apparatus as claimed in claim 1, wherein a drivable element is arranged on the counter element, which drivable element includes a guiding surface which cooperates with a guiding protrusion movable relative to the counter element in such a way that this relative movement of the guiding protrusion causes a rotation of the counter element.

4. The apparatus as claimed in claim 3, wherein the guiding surface is curved at least in sections.

5. The apparatus as claimed in claim 1, wherein a bevel gear is arranged at least on the actuating element.

6. The apparatus as claimed in claim 1, wherein the actuating element includes an engagement device which cooperates with a thread arranged on the counter element so as to cause the rotation thereof.

7. The apparatus as claimed in claim 6, wherein the counter element includes a first thread which is an external thread and the actuating element includes a second thread which is an internal thread.

8. The apparatus as claimed in claim 1, wherein the apparatus includes a guiding rod extending parallel to the counter element for guiding a movement of the actuating element.

9. The apparatus as claimed in claim 1, wherein the drive element cooperates with an end-side driven element disposed in the counter element.

10. A blow mould, for an apparatus for moulding plastic preforms into containers, said blow mould including two mould parts that can be pivoted relative to each other about a connection axis, including at least one locking element arranged on one of the mould parts, which locking element cooperates with at least one counter element arranged on the other mould part, in order to lock the two mould parts against each other, said counter element being arranged on an axis (Y, Y') essentially parallel to the connection axis (X), which counter element is rotatable between a locking position in which the blow mould is locked and an unlocking position in which the blow mould can be opened, said counter element being designed in such a way that the counter element rests in the locking position at least partially on the locking element and in the unlocking position releases the locking element, wherein an actuating element for rotating the counter element is provided, said actuating element including a drive element cooperating with the counter element so as to actuate the counter element, and wherein the actuating element is movable in the direction of a rotary axis (Y) of the counter element.

11. An apparatus for moulding plastic preforms into containers, including at least one blow mould for receiving the plastic preforms, said blow mould including two mould parts that can be pivoted relative to each other about a connection axis, including at least one locking element arranged on one of the mould parts, which locking element cooperates with at least one counter element arranged on the other mould part, in order to lock the two mould parts against each other, said counter element being arranged on an axis (Y, Y') essentially parallel to the connection axis, which counter element is rotatable between a locking position in which the blow mould is locked and an unlocking position in which the blow mould can be opened, said counter element being designed in such a way that the counter element rests in the locking position at least partially on the locking element and in the unlocking position releases the locking element, wherein the apparatus includes an actuating element for rotating the counter element, said actuating element including a drive element cooperating with the counter element so as to actuate the counter element, wherein the actuating element includes an engagement device which cooperates with a thread arranged on the counter element so as to cause the rotation thereof.

12. The apparatus as claimed in claim 11, wherein the counter element includes a first thread which is an external thread and the actuating element includes a second thread which is an internal thread.

13. The apparatus in claim 11, wherein the apparatus includes a guiding rod extending parallel to the counter element for guiding a movement of the actuating element.

14. An apparatus for moulding plastic preforms into containers, including at least one blow mould for receiving the plastic preforms, said blow mould including two mould parts that can be pivoted relative to each other about a connection axis, including at least one locking element arranged on one of the mould parts, which locking element cooperates with at least one counter element arranged on the other mould part, in order to lock the two mould parts against each other, said counter element being arranged on an axis (Y, Y') essentially parallel to the connection axis, which counter element is pivotable between a locking position in which the blow mould is locked and an unlocking position in which the blow mould can be opened, said counter element being designed in such a way that the counter element rests in the locking position at least partially on the locking element and in the unlocking position releases the locking element, wherein the apparatus includes an actuating element for actuating the counter element, said actuating element including a drive element cooperating with the counter element so as to actuate the counter element, and wherein the actuating element is moveable in the direction of a rotating axis (Y) of the counter element.

15. The apparatus as claimed in claim 14, wherein the counter element is rotatably arranged on the actuating element.

16. The apparatus as claimed in claim 14, wherein a cam roller is arranged on the actuating element.

17. The apparatus as claimed in claim 16, wherein the cam roller comprises a double cam roller.

18. The apparatus of claim 14, wherein a roller, disposed on a roller support, is provided on the actuating element and extends in a groove formed on or in the counter element.

* * * * *